Patented May 15, 1934

1,958,578

UNITED STATES PATENT OFFICE 1,958,578

PROCESS FOR ABSORBING OLEFINES IN STRONG ACIDS

Hendrik Willem Huijser and Johannes Andreas van Melsen, Amsterdam, Netherlands, assignors to Naamlooze Vennootschap De Bataafsche Petroleum Maatschappij, The Hague, Netherlands No Drawing. Application October 15, 1931, Serial No. 569,110. In the Netherlands November 4, 1930

6 Claims. (Cl. 260—98)

This invention relates to an improved process for absorbing olefines in strong acids.

It is known to absorb olefines with one or more double bonds in strong acids in the presence of one or more possibly anhydrous metallic-cyano complexes.

By means of these catalysts in the first place the formation of undesirable oily polymerization products, occuring with the known processes for absorbing olefines in strong acids, is almost entirely avoided.

Moreover the rate of absorption is increased as compared with the known processes for absorbing olefines in strong acids.

It has now been found that the rate of absorption of olefines with one or more double bonds in strong acids can still be considerably increased, without giving rise to the formation of oily polymerization products, by effecting the absorption in the presence of one or more non-hydrolyzable or practically non-hydrolyzable compounds of hydrocarbons with one or more double carbon bonds in the molecule, such as propylene, normal butylene, isobutylene, trimethyl ethylene, diamylene, isoprene, cyclo-hexene, pinene, with metallic-cyano complexes, such as ferrocyanide of potassium, ferrocyanic acid or ferricyanic acid.

The catalysts according to the invention may be prepared e. g. by adding ferrocyanide of potassium, ferrocyanic acid or ferricyanic acid to concentrated or slightly diluted sulphuric acid and thereupon bringing the hydrocarbon, which is to form the other component of the double compound, in liquid or gaseous state into reaction with the liquid obtained.

The complexes obtained are not readily soluble in oil or pentane, but easily soluble in ethyl acetate and also in sulphuric acid of any concentration, in water and in diluted lye. Some of them can only be separated by rendering the solution rather strongly alkaline (e. g. 5–10% lye) and by heating it, causing the separation of a partly decomposed product.

It has not been established with certainty whether the double compounds obtained in this manner and which are to be used as catalysts are addition products of several single olefine molecules with the complex cyanides used, or addition products of one or more molecules of olefine polymerides with the complex cyanides.

It is recommendable to prepare the catalysts in the above described manner in 90% sulphuric acid and then to dilute the liquid to the concentration desirable for the absorption proper of olefines.

With the process according to the invention not only an improved asbsorption is obtained, preventing at the same time the formation of polymerization products, but moreover the limits of the concentration of acid which can be used for a certain olefine can be considerably widened. That the latter is of great importance is evident from the fact that in choosing the concentration of the acid the circumstances under which the alkyl sulphuric acids are to be worked up may be taken into account.

The olefines to be absorbed may be applied in the pure or practically pure state or mixed with other inert or noninert compounds. The olefines may be of any origin whatever, they may, for instance, be obtained from gases or products formed by distilling or cracking petroleum or petroleum products or by destructive hydrogenation of carbonaceous materials.

The olefines to be treated may be previously separated from the above mentioned products, but it is also possible to subject the latter directly to the treatment according to the invention.

The invention relates to all kinds of olefines, including those with two or more double bonds. The reaction may be effected at ordinary pressure or at a pressure above or below atmospheric pressure, whilst also the temperature may vary within wide limits.

For absorbing the olefines according to the invention not only sulphuric acid may be used, but also other strong acids, such as phosphoric or sulphonic acids.

Examples 1. 100 cc. of 89.7% sulphuric acid was agitated for one hour with 5 grams of yellow prussiate of potassium, after which 8 cc. of trimethyl ethylene was added and agitation continued for ¼ hour.

Then propylene was added at a temperature of 26–27° C. at a rate of 3 litres gas per hour. Of 10 litres of gas added 9.5 litres were absorbed, whilst no oily polymeride separated out.

In order to ascertain whether the reaction-liquid nevertheless contained polymerides, the liquid was diluted to 20% sulphuric acid and agitated with pentane, after which the pentane was washed with water, dried and distilled off. 0.53 gram of polymeride remained, which, however, did not proceed from the propylene passed through the sulphuric acid but from the trimethyl ethylene used for the catalyst. This appeared from the determination of polymerides which was effected as prescribed in a liquid composed entirely according to Example 1 but through which no propylene had been passed, and in which 0.55 gram of polymeride was found. The absorption of propylene may be promoted by adding a small quantity of isobutylene to the propylene.

2. Into a solution of 100 cc. 90% sulphuric acid and 5 grams $K_4Fe(CN)_6 3H_2O$ 120cm³ (=0.28 gram) of gaseous isobutylene were introduced, after which at 20° C. 10.3 litres of pure propylene gas were introduced at a rate of 3 litres per hour. The absorption amounted to 8.95 litres or 87% of the propylene introduced. The liquid may again be used for propylene absorption.

3. In a similar manner as described in Example 2 a solution of isobutylene ferrocyanide double compound in 89.7% sulphuric acid was prepared, and then diluted to 60% sulphuric acid. Into 260 cc. thereof 10 litres of isobutylene were introduced in 4½ hours at 20° C. The absorption amounted to 9.35 litres.

4. Into 100 cc. 60% sulphuric acid with about 5 grams isobutylene ferrocyanide double compound (prepared according to Example 3) a mixture of 26.1 volume percent trimethyl ethylene and 73.9% air was introduced at 20° C. at a rate of 3 litres per hour. Of 10.50 litres of gas introduced 1.80 litres were absorbed. The olefine content of the final gas amounted to 10.9%.

5. Propylene was introduced into a solution of 6 grams of yellow prussiate of potassium in 100 cc., 100% sulphuric acid at a temperature of 35–40° C. After 4 litres of propylene had been absorbed the solution was heated for ¾ hour to about 70° C. resulting in the conversion of all the isopropyl sulphuric acid into the desired double compound. The liquid, which had remained clear, was then diluted to 65% acid, after which at a temperature of 22° C. isobutylene was introduced at a rate of 2.9 litres per hour. Of 7.35 litres 5.85 litres, i. e. 79%, were absorbed without the formation of polymerides of any importance.

6. 4.22 litres of normal butylene were absorbed in a solution of 5 grams yellow prussiate of potassium in 100 cc. 89.7% sulphuric acid. No polymeride was formed and the somewhat turbid liquid maintained its original appearance. After having been left standing for a night, propylene was introduced at a rate of 2.4 litres per hour at a temperature of 21° C. Of 4.2 litres 4.12 litres or 98% were absorbed. The test can be repeated several times with the liquid used before the absorption efficiency decreases.

7. In 100 cc. 98.8% $H_2SO_4$ to which 5 grams $K_4Fe(CN)_6$ had been added, 2.11 litres of isobutylene were absorbed. After agitating for ¼ hour the solution was diluted to 85% acid. Into 100 cc. of this solution normal butylene was then introduced at a temperature of 18° C. and at a rate of 2.75 litres per hour. After 3¾ hours 9.24 litres or 90% proved to have been absorbed out of 10.32 litres, whilst by pentane extraction only 0.2 gram of polymerides could be found.

8. To 100 cc. 90% sulphuric acid 5 grams $K_4Fe(CN)_6$ and 5 grams pure cyclo-hexene were added simultaneously, after which agitation took place during one night. Thereupon pure propylene was introduced at 18° C. In 3½ hours 8.58 litres or 86% of propylene were absorbed out of 9.95 litres.

9. To 100 cc. 90% $H_2SO_4$ 5 grams of $K_4Fe(CN)_6$ were added and thoroughly distributed by agitating. To the resultant mixture 8 cc. of isoprene were carefully added drop by drop, after which agitation was repeated for 24 hours. The colour of the solution then obtained was brown; a small quantity of a semi-solid substance floated on the surface and was removed. Then propylene was introduced into the clear solution at 17° C. at a rate of 4.4 litres per hour. After 1⅓ hours 5.77 litres out of 5.85 litres proved to have been absorbed, i. e. 98%.

10. 5 grams of red prussiate of potassium were agitated for some minutes with 100 cc. 90% $H_2SO_4$, after which the non-dissolved part was drawn off. 4 litres of isobutylene were then introduced into the clear solution, after which again agitation took place for some minutes. Then propylene was introduced at 18° C. Of 7.0 litres introduced in 2½ hours 6.5 litres, or 93%, were absorbed.

It is evident that the invention also includes the absorption of olefines in the presence of double compounds of a mixture of, for instance, two hydrocarbons with one or more double carbon bonds in the molecule with the metallic-cyano complexes. Thus it has been found, for instance, that a double compound of a mixture of trimethyl ethylene and methyl ethyl ethylene with e. g. ferrocyanide of potassium also promotes the absorption of propylene in e. g. 90% sulphuric acid.

It is to be observed that the following expressions when used in the specification and claims have the herein defined meaning. Thus, the expression "under polymerizing conditions" means such acid concentration and such temperature as will polymerize the olefine under treatment. As those skilled in the art know, the acid concentration and the temperature will vary according to the olefine to be polymerized. Of course, such conditions exclude the formation of esters and other products. In the same way, the expression "ester-forming conditions" means such conditions with regard to temperature and acid concentration that olefines when led into acid react with the latter to form esters. Furthermore, the term "non-hydrolyzable compounds" means compounds which cannot be converted into alcohols by means of water.

What we claim is:

1. A process for absorbing olefines having at least one double bond in strong acids and in the presence of at least one metallic cyano complex which comprises absorbing olefines under polymerizing conditions in a strong acid containing metallic cyano complexes and resulting in reaction products essentially consisting of substantially non-hydrolyzable double compounds consisting of an olefine and the metallic cyano complex to produce an absorption liquid, and subsequently absorbing olefines under ester-forming conditions.

2. The process set forth in claim 1 in which the same olefines are absorbed in the second step as are used in the first step.

3. The process set forth in claim 1 in which a concentrated acid is used.

4. The process set forth in claim 1 in which the strong acid has a strength of approximately 90%.

5. The process set forth in claim 1 in which the olefine to be absorbed is in the liquid state.

6. The process set forth in claim 1 in which the olefine to be absorbed is in the gaseous state.

HENDRIK WILLEM HUIJSER.
JOHANNES ANDREAS VAN MELSEN.